(12) United States Patent
Kramer

(10) Patent No.: US 6,353,384 B1
(45) Date of Patent: Mar. 5, 2002

(54) WHEEL ROTATION SENSOR AND ACCELEROMETER TO DETERMINE OUT OF BALANCE CONDITION

(75) Inventor: Dennis A. Kramer, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/371,142

(22) Filed: Aug. 9, 1999

(51) Int. Cl.[7] ............................................... B60Q 1/00
(52) U.S. Cl. .................... 340/438; 340/440; 340/442; 340/467; 701/69; 701/70; 701/71
(58) Field of Search ........................... 340/438, 440, 340/442, 467, 669; 701/69, 70, 71; 73/66

(56) References Cited

U.S. PATENT DOCUMENTS

| | | | | |
|---|---|---|---|---|
| 3,668,629 A | * | 6/1972 | Pawl ........................... | 340/453 |
| 3,675,495 A | * | 7/1972 | MacMillan .................. | 73/466 |
| 3,731,540 A | * | 5/1973 | Emanuel et al. ............. | 73/466 |
| 4,374,421 A | * | 2/1983 | Leiber ......................... | 701/72 |
| 4,852,009 A | * | 7/1989 | Jonner et al. ................ | 701/72 |
| 4,870,582 A | * | 9/1989 | Hoashi et al. ............... | 701/72 |
| 4,930,083 A | * | 5/1990 | Hoashi et al. ............... | 701/72 |

FOREIGN PATENT DOCUMENTS

| | | |
|---|---|---|
| DE | 3817809 A1 | 12/1989 |
| DE | 3937403 A1 | 5/1991 |
| EP | 0421065 A2 | 4/1991 |

OTHER PUBLICATIONS

European Search Report, Dec. 11, 2000.

* cited by examiner

Primary Examiner—Jeffery Hofsass
Assistant Examiner—Daniel Previl
(74) Attorney, Agent, or Firm—Carlson, Gaskey & Olds

(57) ABSTRACT

A system for determining an out of balance wheel condition on a vehicle incorporates a wheel speed signal such as provided by ABS systems. The wheel speed signal is associated with acceleration information from an accelerometer on the axle. If a particular acceleration profile is repeated across several rotational cycles of the wheels, then an indication is made that an out of balance condition exists.

13 Claims, 1 Drawing Sheet

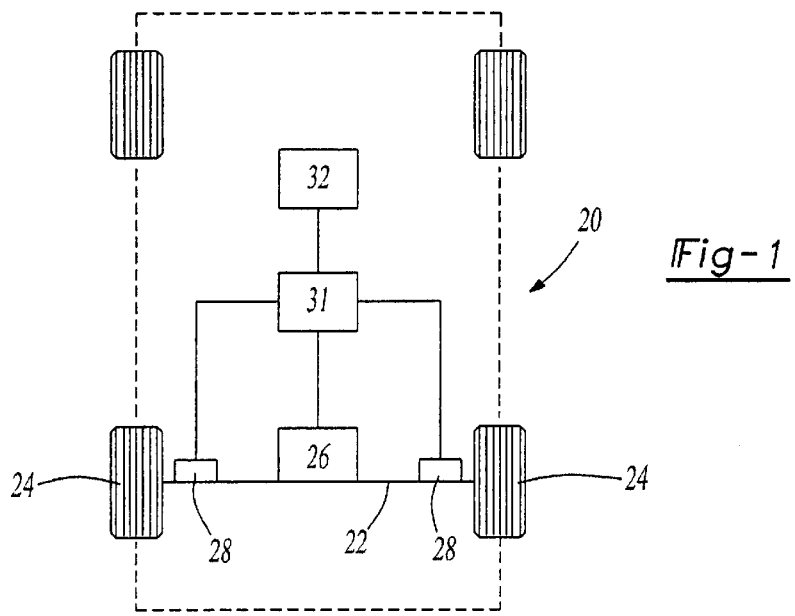
Fig-1
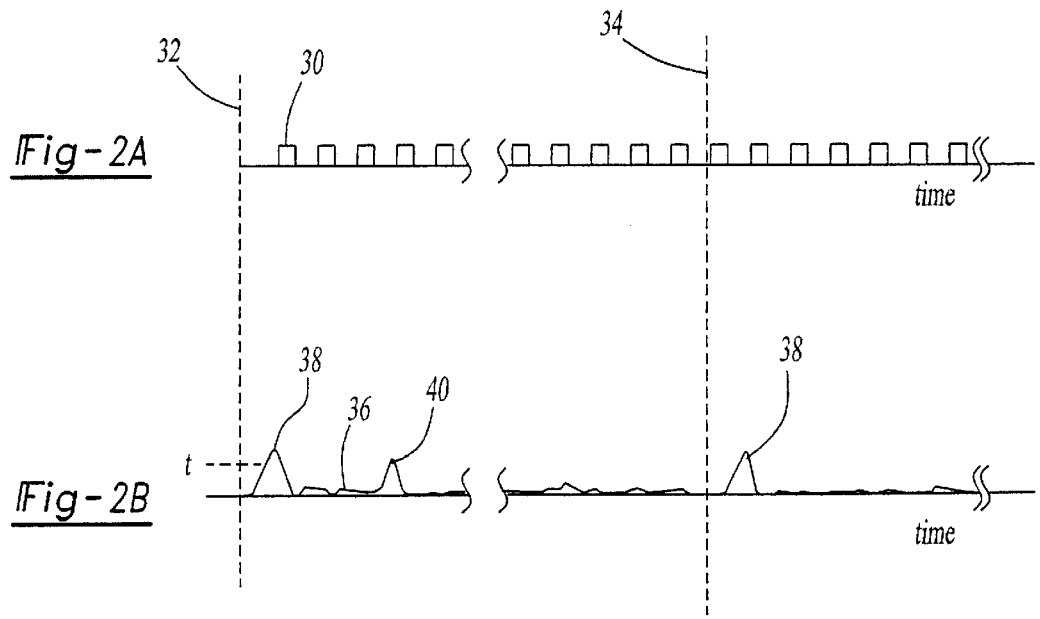
Fig-2A
Fig-2B she# WHEEL ROTATION SENSOR AND ACCELEROMETER TO DETERMINE OUT OF BALANCE CONDITION

BACKGROUND OF THE INVENTION

This invention relates to the use of wheel rotation information and its correlation with accelerometer data to determine an out of balance wheel condition.

Modern vehicles are being provided with more and more electrical components to provide various functions. As an example, many modern vehicles are provided with ABS brake systems. An ABS brake system monitors a number of aspects of the rotation of the wheels. As one main aspect, an ABS system incorporates a wheel rotation sensor that senses up to 60 pulses per revolution of the wheel. This information is utilized to determine how and when brakes should be applied. This information has not been utilized for other diagnostic functions, however, but is easily available to a vehicle controller.

One main problem with tire wear on modern vehicles is an out of balance condition. Wheels have typically been balanced relative to each other during maintenance, and at a garage. The determination of when wheels are out of balance has typically been left to the maintenance function. There has not been an easy way of actively detecting an out of balance condition on the moving wheels. This results in undesirable tire wear.

The present invention discloses a method and apparatus for utilizing available information to determine an out of balance condition.

SUMMARY OF THE INVENTION

The present invention incorporates an accelerometer onto an axle of a vehicle. The accelerometer information determined by the sensor provides an indication of when there are acceleration peaks on the axle. Further, a sensor which determines wheel rotation is also fed to the controller. This sensor may be the sensor which is already provided as part of an ABS system. Such systems provide up to 60 pulses per tire revolution. The controller associates the rotation information with the accelerometer information temporally. That is, the acceleration information at each of the wheel rotational signals from the wheel sensor are associated.

If a wheel is out of balance, then a pattern of similar accelerations should be seen on each revolution of the wheel. The sensor can then look for peaks in the acceleration information, and see if those peaks are associated with a similar point of wheel rotation. If so, a signal can then be sent that the wheels are out of balance and should be checked. The present invention thus provides a simple, inexpensive and active way of determining an out of balance condition without the necessity of returning the vehicle to a garage for maintenance.

These and other features of the present invention can be best understood from the following specification and drawings, the following of which is a brief description.

BREIF DESCRIPTION OF THE DRAWINGS

FIG. 1 is a schematic view of the system incorporating the present invention.

FIG. 2A is a graph of wheel rotation information against time.

FIG. 2B is a graph of acceleration associated with the wheel rotation information of FIG. 2A.

DETAILED DESCRIPTION OF A PREFERRED EMBODIMENT

A vehicle 20, shown schematically, incorporates an axle 22 mounting wheels 24 at each end. An accelerometer 26 is placed on the axle 22. Wheel speed sensors 28, which may be part of an ABS brake system, are also utilized to provide information to a controller 31. While the controller 31 is defined as a separate controller for the determination of the out of balance wheel condition of this invention, it should be understood that a main vehicle controller, or any subsystem controller, can be programmed to provide the appropriate responses. Any suitable electronic controller can be utilized to perform the method of this invention.

As shown in FIG. 2A, known ABS wheel sensors 28 provide a series of pulses 30 associate with each portion of the revolution of the wheel. Typically, there are 60 pulses per revolution. Separate rotations are shown with arbitrary starting points 32 and 34 would cause an acceleration peak at a point on each wheel rotation such as shown at 38. Road conditions will also cause peaks such as shown at 40. However, peaks 38 are repeated on each rotation at an approximately equal point measured from starting points 32 and 34. Peaks 40 would not be repeated.

As shown in FIG. 2B, the accelerometer preferably determines accelerations along the axis of the axle and provides a signal 36. The two wheels being out of balance.

Control 31 receives the accelerometer information 22, such as shown in FIG. 2B. Control 31 correlates the pulses 30 against the acceleration information as shown across FIGS. 2A and 2B.

More simple, the accelerometer information 36, once it has been correlated with the rotation information, can be seen to have several peaks 38, 40, 38. If the information on graph 36 is studied, it can be seen that peaks 38 are associated soon after the arbitrary beginning of each rotational cycle. The peak 40 occurs once, but does not occur in each rotational cycle. Although only two rotational cycles are shown in FIGS. 2A and 2B, it should be understood that control 31 might look at a minimum larger number of cycles before predicting an out of balance condition.

The system can predict that an out of balance condition exists since the peaks 38 occur at roughly the same point at each rotation of the wheel. The peaks such as peak 40, which occur occasionally, are more likely due to road conditions than a problem with the wheels. By looking for a peak at a particular point in the cycle over a number of cycles, the control 31 can thus predict an out of balance condition. If so, a signal can be sent to a display 32 for the operator, such as an audio visual, or any other type display. Alternatively, the control 31 may simply record the information to be accessed by maintenance personnel at a later point.

Further, there may be a threshold level t for the size of the peaks 38 before an out of balance condition is indicated. Also, control 31 may check to ensure peaks are within a certain magnitude of each other. Also, the accelerometer could also be more sophisticated and look for acceleration peaks along all three axes. Again, any acceleration peak which occur at similar points on each revolution would be indicative of an out of balance condition.

Although a preferred embodiment of this invention has been disclosed, it should be understood that certain modifications would come within the scope of this invention. For that reason, the following claims should be studied to determine the true scope and content of this invention.

What is claimed is:

1. A method of determining a wheel condition for a moving vehicle comprising the steps of:
   (1) associating an accelerometer with a pair of wheels on a vehicle;
   (2) providing a timing signal of the rotation of at least one wheel on a vehicle;
   (3) associating accelerometer information with said timing information on wheel rotation while the vehicle is being driven;
   (4) determining whether acceleration profiles repeat on repeated revolutions of said wheels; and
   (5) indicating an out of balance condition when a positive determination is made at step (4).

2. A method as set forth in claim 1, wherein said timing information is ABS rotation information on the vehicle.

3. A method as set forth in claim 2, wherein said ABS information includes a series of pulses indicating particular positions in the rotational cycle of the tire.

4. A method as set forth in claim 1, wherein said acceleration information is provided by an accelerometer mounted on an axle between two of said wheels.

5. A method as set forth in claim 1, wherein a minimum acceleration level is required for an indication of an out of balance condition.

6. A method as set forth in claim 1, wherein an out of balance display is provided.

7. A method as set forth in claim 1, wherein when a determination is made that a particular acceleration profile is not repeating, no determination of an out of balance condition is made.

8. A system for determining an out of balance wheel comprising:
   an axle mounting a pair of opposed wheels;
   a pair of wheels mounted on said axle;
   wheel speed rotation sensors associated with at least one of said wheels and communicating with a control;
   an accelerometer mounted adjacent said axle to provide acceleration information on said axle to said control; and
   said control operable to associate said wheel speed information with said accelerometer information while the wheels are being driven to determine whether a particular acceleration profile is repeating on each revolution of said wheels, and a repeating acceleration profile being identified as an out of balance condition.

9. A system as recited in claim 8, wherein a signal is provided should an indication be made that an acceleration profile is repeating on plural rotations of the wheel.

10. A system as recited in claim 8, wherein said wheel speed information is ABS rotation pulses.

11. A system as recited in claim 8, wherein said accelerometer determines accelerations along the axis of said axle.

12. A system as recited in claim 8, wherein said acceleration profiles must exceed a predetermined limit before an indication is made that an out of balance condition exists.

13. A system as recited in claim 8, wherein said control being operable to recognize that a non-repeating acceleration profile is not indicative of an out of balance condition.

* * * * *